(12) United States Patent
Ryu et al.

(10) Patent No.: US 8,564,618 B2
(45) Date of Patent: Oct. 22, 2013

(54) ADJUSTING THE DISPLAY ORIENTATION OF AN IMAGE ON A MOBILE TERMINAL

(75) Inventors: Hye Jin Ryu, Seoul (KR); Junserk Park, Seoul (KR); Dongseok Lee, Seoul (KR); Moon Ju Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 679 days.

(21) Appl. No.: 12/423,769

(22) Filed: Apr. 14, 2009

(65) Prior Publication Data

US 2010/0066751 A1 Mar. 18, 2010

(30) Foreign Application Priority Data

Sep. 12, 2008 (KR) ........................ 10-2008-0090270

(51) Int. Cl.
*G09G 5/00* (2006.01)
(52) U.S. Cl.
USPC .......................................... 345/629; 345/659
(58) Field of Classification Search
USPC .................................................. 345/659, 629
See application file for complete search history.

(56) References Cited

U.S. PATENT DOCUMENTS

| 2006/0026521 | A1* | 2/2006 | Hotelling et al. | 715/702 |
| 2007/0159658 | A1* | 7/2007 | Kato | 358/3.21 |
| 2008/0194323 | A1* | 8/2008 | Merkli et al. | 463/30 |
| 2008/0242352 | A1* | 10/2008 | Koshijima et al. | 455/556.1 |
| 2010/0007603 | A1* | 1/2010 | Kirkup | 345/158 |

FOREIGN PATENT DOCUMENTS

| CN | 1499816 | 5/2004 |
| CN | 101184298 | 5/2008 |
| JP | 2007-206921 | 8/2007 |

* cited by examiner

*Primary Examiner* — Aaron M Richer
*Assistant Examiner* — Weiming He
(74) *Attorney, Agent, or Firm* — Lee, Hong, Degerman, Kang & Waimey

(57) ABSTRACT

A method of displaying a first image on a mobile terminal, the method comprising: displaying a first image and a second image overlaid on the first image on a display unit of the mobile terminal; and changing the orientation of the first image and the second image according to a variation in the orientation of the mobile terminal.

16 Claims, 14 Drawing Sheets

ADJUSTING THE DISPLAY ORIENTATION OF AN IMAGE ON A MOBILE TERMINAL

CROSS-REFERENCE TO RELATED APPLICATIONS

Pursuant to 35 U.S.C. 119(a), this application claims the benefit of earlier filing date and right of priority to Korean Patent Application No. 10-2008-0090270 filed on Sep. 12, 2008, the entire contents of which are hereby incorporated by reference.

TECHNICAL FIELD

The present disclosure relates to a mobile terminal and a method for displaying an image thereon.

BACKGROUND

As the functions of terminals such as personal computers, laptop computers, cellular phones and the like are diversified, the terminals are constructed in the form of multimedia players having multiple functions for capturing pictures, playing music, and receiving broadcasting programs. Terminals may be divided into two groups: mobile terminals and stationary terminals. The mobile terminals may be classified into hand-held terminals and vehicle mount terminals according to whether users may personally carry the terminals.

Efforts are ongoing to support and increase the functionality of mobile terminals. Such efforts include software and hardware improvements, as well as changes and improvements in the structural components which form the mobile terminal. In terms of design, folder type, slide type, bar type, or rotation type design may be applied for mobile terminals.

As a wireless Internet function and a multimedia function of a mobile terminal are enhanced, the size of the display screen of the mobile terminal increases and thus high picture quality images may be displayed. Furthermore, the performance of a camera attached to the mobile terminal is also improved. A conventional mobile terminal with a camera has various photographing functions such as white balancing, special effect photographing and frame image insertion functions.

Additionally, an output image displayed on a display unit of a mobile terminal may be changed according to the orientation of the mobile terminal, that is, a portrait orientation or a landscape orientation. However, when a frame insertion function is selected, the display unit displays the frame around the images in a fixed orientation regardless of the orientation of the mobile terminal. Methods and systems are needed to improve upon the current state of the technology to provide a user with more options when capturing images in frames.

SUMMARY

In one embodiment, a method of displaying a first image on a mobile terminal is provided. The method comprising: displaying a first image and a second image overlaid on the first image on a display unit of the mobile terminal; and changing the orientation of the first image and the second image according to a variation in the orientation of the mobile terminal.

In accordance with another embodiment, a mobile terminal comprises a display unit displaying a first image and a second image; and a controller for displaying the second image such that the second image is overlaid on the first image and for changing the orientation of the second image according to a variation in the orientation of the mobile terminal.

In certain embodiments, a computing system implemented method comprises graphically applying a frame to an image displayed on a display of a mobile terminal such that the frame is overlaid on top of the image, wherein the frame has a border and an opening within said border through which a first portion of the image is displayed whiled a second portion of the frame is disguised under the border; changing the orientation of the image in relationship with the display, in response to detecting a change in physical orientation of the mobile terminal, from a first orientation to a second orientation; changing the orientation of the frame in relationship with the display, in response to detecting a change in physical orientation of the mobile terminal, from the first orientation to the second orientation; and resizing the opening of the frame to adjust degree with which the first portion of the image is displayed through the opening of the frame, in response to user interaction with the mobile terminal.

The orientation of the frame in relationship with the display may be changed to the same degree and in the same direction as the orientation of the image is changed in relationship with the display. The orientation of the image or the frame in relationship with the display may be changed when the difference in angle of rotation between the first orientation and the second orientation is greater than a first threshold.

The present disclosure will become more fully understood from the detailed description given below and the accompanying drawings, which are given by illustration, and thus are not limitative of the present disclosure.

DETAILED DESCRIPTION OF EXAMPLE EMBODIMENTS

Figure 1:
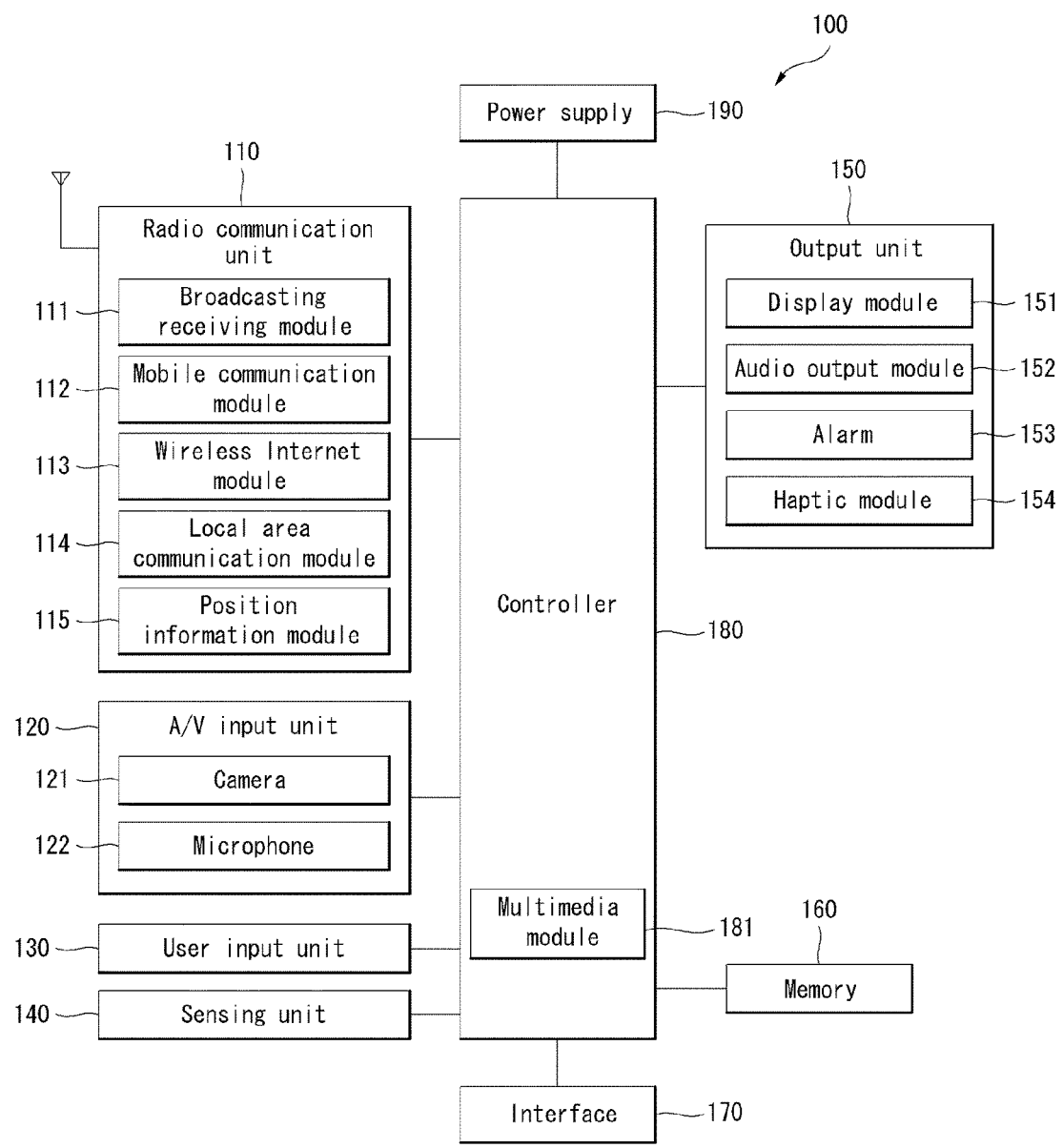
FIG. 1 is a block diagram of a mobile terminal according to one embodiment.

Reference will now be made in detail to the preferred embodiments of the present disclosure, examples of which are illustrated in the accompanying drawings. If a detailed explanation for a related known function or construction is considered to unnecessarily divert the gist of the present disclosure, such explanation has been omitted but would be understood by those skilled in the art. In describing the present disclosure with reference to the accompanying drawings, like reference numerals are used for elements performing like functions.

Hereinafter, a mobile terminal relating to the present disclosure will be described below in more detail with reference to the accompanying drawings. In the following description, the terms "module" and "unit" are used to describe different aspects of the claimed subject matter and should not be construed as having a limited meaning or refer to functions different from each other.

Referring to FIG. 1, a mobile terminal 100 according to one embodiment may be implemented in various configurations or form factors. Examples of such terminals include a cellular phone, user equipment, a smart phone, a computer, a digital broadcasting terminal, personal digital assistants (PDA), a portable multimedia player (PMP), a navigation system, and so on. Those skilled in the art will appreciate that configurations according to embodiments of the present disclosure may also be applied to stationary terminals such as digital TV and desktop computers except a case where the configurations may be applied to only mobile terminals.

The mobile terminal 100 may include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal may be varied. Greater or fewer components may alternatively be implemented. For example, the radio communication unit 110 may include one or more components allowing radio communication between the mobile terminal 100 and a wireless communication system or a network in which the mobile terminal 100 is located.

In one embodiment, the radio communication unit 110 may include a broadcasting receiving module 111, a mobile communication module 112, a wireless Internet module 113, a local area communication module 114 and a position information module 115. The broadcasting receiving module 111 receives broadcasting signals and/or broadcasting related information from an external broadcasting management server through a broadcasting channel.

The broadcasting channel may include a satellite channel and a terrestrial channel. The broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals and data broadcasting signals but also signals in the form of combination of a TV broadcasting signal and a radio broadcasting signal.

The broadcasting related information may be information on a broadcasting channel, a broadcasting program or a broadcasting service provider. The broadcasting related information may also be provided through a mobile communication network (e.g., that operates according to standards such as 3GPP, 3GPP2, IEEE, CDMA, GSM, OMA, or so-called 4G techniques, etc.) and, in this case, the broadcast related information may be received by the mobile communication module 112. The broadcast related information may exist in various forms. For example, the broadcast related information may exist in the form of electronic program guide (EPG) of digital multimedia broadcasting (DMB) or in the form of electronic service guide (ESG) of digital video broadcast-handheld (DVB-H), etc.

The broadcasting receiving module 111 receives broadcasting signals using various broadcasting systems. Particularly, the broadcasting receiving module 111 may receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 may be constructed to be suited to broadcasting systems providing broadcasting signals other than the above-described digital broadcasting systems.

The broadcasting signals and/or broadcasting related information received through the broadcasting receiving module 111 may be stored in the memory 160 (or other type of storage medium). The mobile communication module 112 transmits/receives a radio signal to/from at least one of a base station (e.g., access points, Node Bs, etc.), an external terminal (e.g., other user devices) and a server on a mobile communication network (or other network entities). The radio signal may include a voice call signal, a video telephony call signal or data in various forms according to transmission and receiving of text/multimedia messages.

The wireless Internet module 113 means a module for wireless Internet access and may be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on may be used as a wireless Internet technique. The local area communication module 114 means a module for local area communication. Bluetooth™, radio frequency identification (RFID), Infrared Data Association (IrDA), Ultra-Wideband (UWB) and ZigBee™, and the structural or functional equivalents may be used as a local area communication technique. The position information module 115 confirms or obtains the position of the mobile terminal 100.

A global positioning system (GPS) module is a representative example of the position information module 115. According to the current technology, the GPS module 115 may calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and may include a camera 121 and a microphone 122. The camera 121 processes image frames of still images or moving images obtained by an image sensor in a video telephony mode or a photographing mode. The processed image frames may be displayed on a display unit 151. The image frames processed by the camera 121 may be stored in the memory 160 or transmitted to an external device through the radio communication unit 110. The mobile terminal 100 may include at least two cameras according to constitution of the mobile terminal 100.

The microphone 122 receives an external audio signal in a call mode, a recording mode or a speed recognition mode and processes the received audio signal into electric audio data. The audio data may be converted into a form that may be transmitted to a mobile communication base station through the mobile communication module 112 and output in the call mode. The microphone 122 may employ various noise removal algorithms for removing noise generated when the external audio signal is received. The user input unit 130 receives input data for controlling the operation of the mobile terminal 100 from a user. The user input unit 130 may include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 may sense whether a slide phone is opened or closed when the mobile terminal 100 is a slide phone. Furthermore, the sensing unit 140 may sense whether the power supply 190 supplies power and whether the interface 170 is connected to an external device. The sensing unit 140 may include a proximity sensor 141.

The output unit 150 generates visual, auditory or tactile output and may include the display unit 151, an audio output module 152, an alarm 153 and a haptic module 154. The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode. The display unit 151 may include at least one of a liquid crystal display, a thin film transistor liquid crystal display, an organic light-emitting diode display, a flexible display and a three-dimensional display.

Some of these displays may be of a transparent type or a light transmission type. This may be referred to as a transparent display. The transparent display includes a transparent liquid crystal display. The rear structure of the display unit 151 may also be of the light transmission type. According to this structure, a user may see an object located behind the body of the mobile terminal 100 through an area of the body of the mobile terminal 100, which is occupied by the display unit 151.

The mobile terminal 100 may include at least two display units 151 according to constitution of the mobile terminal 100. For example, the mobile terminal 100 may include a plurality of displays that are arranged on a single face at a predetermined distance or integrated. Otherwise, the plurality of displays may be arranged on different sides. In the case where the display unit 151 and a sensor sensing touch (referred to as a touch sensor hereinafter) form a layered structure, which is referred to as a touch screen hereinafter, the display unit 151 may be used as an input device in addition to an output device. The touch sensor may be in the form of a touch film, a touch sheet or a touch pad, for example.

The touch sensor may be constructed such that it converts a variation in pressure applied to a specific portion of the display unit 151 or a variation in capacitance generated at a specific portion of the display unit 151 into an electric input signal. The touch sensor may be constructed such that it may sense pressure of touch as well as the position and area of touch. When touch input is applied to the touch sensor, a signal corresponding to the touch input is transmitted to a touch controller. The touch controller processes the signal and transmits data corresponding to the processed signal to the controller 180. Accordingly, the controller 180 may detect a touched portion of the display 151.

Referring to FIG. 1, the proximity sensor (not shown) may be located in an internal region of the mobile terminal 100, surrounded by the touch sensor, or near the touch sensor. The proximity sensor senses an object approaching a predetermined sensing face or an object located near the proximity sensor using electromagnetic force or infrared rays without having mechanical contact.

The proximity sensor has lifetime longer than that of a contact sensor and has wide application. The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. A capacitive touch screen is constructed such that proximity of a pointer is detected through a variation in an electric field according to the proximity of the pointer. In this case, the touch screen (touch sensor) may be classified as a proximity sensor.

For convenience of explanation, an action of approaching the pointer to the touch screen while the pointer it not being in contact with the touch screen such that the location of the pointer on the touch screen is recognized is referred to as "proximity touch" and an action of bringing the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern may be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 may include a receiver, a speaker, a buzzer, etc.

The alarm 153 outputs a signal for indicating generation of an event of the mobile terminal 100. Examples of events generated in the mobile terminal 100 include receiving of a call signal, receiving of a message, input of a key signal, input of touch, etc. The alarm 153 may output signals in forms different from video signals or audio signals, for example, a signal for indicating generation of an event through vibration. The video signals or the audio signals may be also output through the display unit 151 or the audio output module 152.

The haptic module 154 generates various haptic effects that the user may feel. A representative example of the haptic effects is vibration. The intensity and pattern of vibration generated by the haptic module 154 may be controlled. For example, different vibrations may be combined and output or sequentially output.

The haptic module 154 may generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 may not only transmit haptic effects through direct contact but also allow the user to feel haptic effects through kinesthetic sense of his fingers or other areas of the body. The mobile terminal 100 may include at least two haptic modules 154 according to constitution of the mobile terminal 100.

The memory 160 (or other storage means) may store software programs or the like for the operation of the controller 180 and may temporarily store input/output data (for example, phone book, messages, still images, moving images, etc.). The memory 160 may store data about vibrations and sounds in various patterns, which are output from when a touch input is applied to the touch screen. The memory 160 may include at least one of a flash memory, a hard disk type memory, a multimedia card micro type memory, a card type memory (for example, SD or XD memory), a random access memory (RAM), a static RAM (SRAM), a read memory (ROM), an electrically erasable programmable ROM (EEPROM), a programmable ROM (PROM) magnetic memory, a magnetic disk, an optical disk and the like. Also, the mobile terminal 100 may operate in relation to a web storage performing the storing function of the memory 160 over a network connection.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 may include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and may include a user identify module (UIM), a subscriber identify module (SIM) and a universal subscriber identify module (USIM). A device (referred to as an identification device hereinafter) including the identification module may be manufactured in the form of a smart card. Accordingly, the identification device may be connected to the mobile terminal 100 through a port. The interface 170 may serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle may be used as a signal for confirming whether the mobile terminal 100 is correctly set in the cradle.

The controller 180 (such as a microprocessor or the like) typically controls the overall operation of the mobile terminal 100. For example, the controller 180 performs control and processing for voice communication, data communication, video telephony and the like. In addition, the controller 180 may include a multimedia module 181 for reproducing (or playing back) multimedia data. The multimedia module 181 may be included within the controller 180 or may be configured to be separated from the controller 180. The controller 180 may perform a pattern recognition process capable of recognizing handwriting input or picture-drawing input applied to the touch screen as characters or images.

The power supply 190 receives external power (via a power cable connection) or internal power (via the battery of the mobile terminal 100) and provides power required for the operations of the components of the mobile terminal 100 under the control of the controller 180. Various embodiments of the present disclosure may be implemented in a computer or similar device readable recording medium using software, hardware or a combination thereof, for example. According to hardware implementation, the embodiments of the present disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electrical units for executing functions. In some cases, the embodiments may be implemented by the controller 180.

According to software implementation, embodiments such as procedures or functions may be implemented with a separate software module executing at least one function or operation. Software codes may be implemented according to a software application (or program) written in any appropriate software language. Furthermore, the software codes may be stored in the memory 160 and executed by the controller 180. So far, the mobile terminal 100 has been described from the perspective of its functions. Hereinafter, external elements of the mobile terminal 100 will be described from the perspective of their functions with reference to FIGS. 2 and 3. Mobile terminal 100 may be implemented in a variety of different configurations. Examples of such configurations include folder-type, bar-type, swing-type, a slide type, as well as various other configurations. The following description will primarily relate to a bar-type mobile terminal 100. However, such description may equally apply to other types of terminals.

The terminal body includes a case (e.g., a casing, a housing, a cover, etc.) forming the exterior of the mobile terminal 100. In the present embodiment, the case may be divided into a front case 101 and a rear case 102. Various electronic components are arranged in the space formed between the front case 101 and the rear case 102. At least one middle case may be additionally arranged between the front case 101 and the rear case 102. The cases may be formed of plastics through injection molding or made of a metal material such as stainless steel (STS) or titanium (Ti). The display unit 151, the audio output unit 152, the camera 121, the user input unit 130/131 and 132, the microphone 122 and the interface 170 may be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102. The user input unit 130 is operated to receive commands for controlling the operation of the mobile terminal 100 and may include a plurality of operating units 131 and 132. The operating units 131 and 132 may be referred to as manipulating portions and employ any tactile manner in which a user operates the operating units 131 and 132 while having tactile feeling.

Figure 2A:
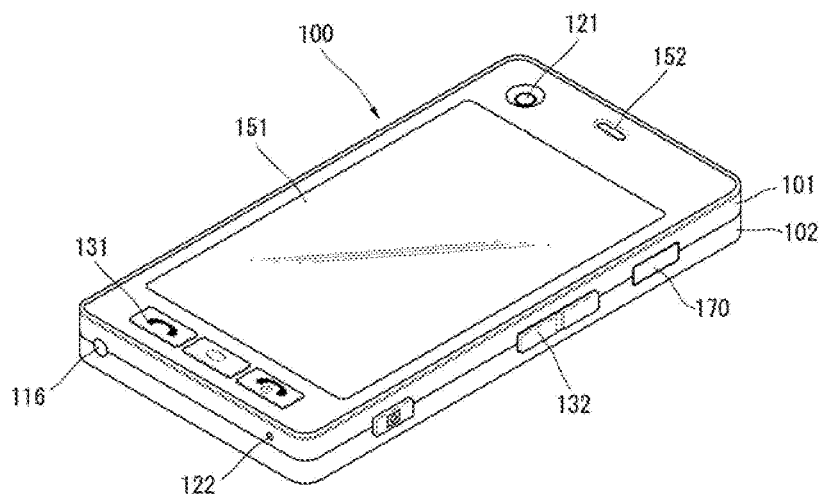
FIG. 2A is a front perspective view of the mobile terminal according to one embodiment.
Figure 2B:
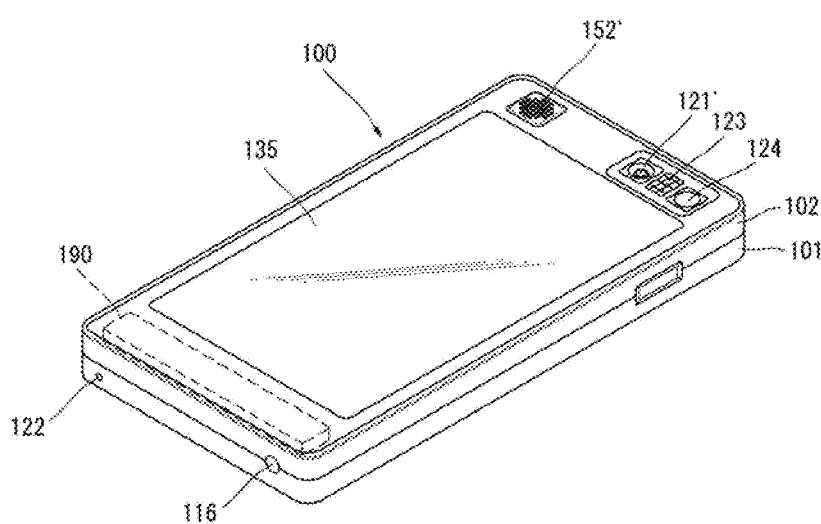
FIG. 2B is a rear perspective view of the mobile terminal according to one embodiment.

First and second operating units 116 and 117 may receive various inputs. For example, the first operating unit 116 receives commands such as start, end and scroll and the second operating unit 117 receives commands such as control of the volume of sound output from the audio output unit 152 or conversion of the display unit 151 to a touch recognition mode. Referring to FIG. 2A, a camera 121' may be additionally attached to the rear side of the terminal body, that is, the rear case 102. The camera 121' has a photographing direction opposite to that of the camera 121 shown in FIG. 2A and may have pixels different from those of the camera 121 shown in FIG. 2A.

For example, it is desirable that the camera 121 has low pixels such that it may capture an image of the face of a user and transmit the image to a receiving part in case of video telephony while the camera 121' has high pixels because it captures an image of a general objects with high picture quality, which may not require immediate transmission in real-time, but which may be stored for later viewing or use. The cameras 121 and 121' may be attached to the terminal body such that they may be rotated or pop-up. A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 shown in FIG. 2A and be used for a speaker phone mode when the mobile terminal 100 is used for a telephone call. A broadcasting signal receiving antenna 124 may be additionally attached to the side of the terminal body in addition to an antenna for telephone calls. The antenna 124 constructing a part of the broadcasting receiving module 111 shown in FIG. 1 may be set in the terminal body such that the antenna 124 may be pulled out of the terminal body. The power supply 190 for providing power to the mobile terminal 100 is set in the terminal body. The power supply 190 may be included in the terminal body or detachably attached to the terminal body.

A touch pad 135 for sensing touch may be additionally attached to the rear case 102. The touch pad 135 may be of a light transmission type as the display unit 151. In this case, if the display unit 151 outputs visual information through both sides thereof, the visual information may be recognized through the touch pad 135. The information output through both sides of the display unit 151 may be controlled by the touch pad 135. Otherwise, a display is additionally attached to the touch pad 135 such that a touch screen may be arranged even in the rear case 102. The touch pad 135 operates in connection with the display unit 151 of the front case 101. The touch pad 135 may be located in parallel with the display unit 151 behind the display unit 151. The touch panel 135 may be identical to or smaller than the display unit 151 in size.

Figure 3A:
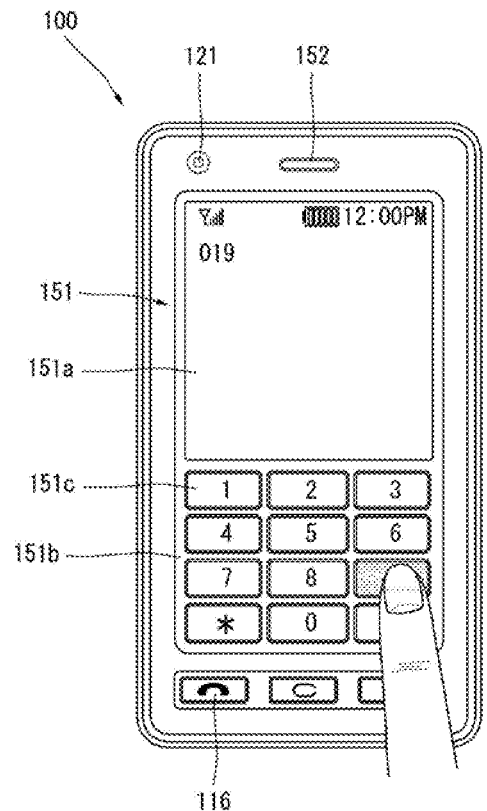
FIGS. 3A and 3B are front views of the mobile terminal for explaining an operation of the mobile terminal according to one embodiment.

Interoperations of the display unit 151 and the touch pad 135 will now be described with reference to FIGS. 3A and 3B. The display unit 151 may display various types of visual information in the form of characters, numerals, symbols, graphic or icons. To input the information, at least one of the characters, numerals, symbols, graphic and icons are displayed in predetermined arrangement in the form of a keypad. This keypad may be referred to as a 'soft key'. FIG. 3A shows that touch applied to a soft key is input through the front side of the terminal body. The display unit 151 may be operated through the overall area thereof. Otherwise, the display unit 151 may be divided into a plurality of regions and operated. In the latter case, the display unit 151 may be constructed such that the plurality of regions interoperate.

For example, an output window 151a and an input window 151b are respectively displayed in upper and lower parts of the display unit 151. The input window 151b displays soft keys 151c that represent numerals used to input numbers such as telephone numbers. When a soft key 151c is touched, a numeral corresponding to the touched soft key 151c is displayed on the output window 151a. When the user operates the first operating unit 116, connection of a call corresponding to a telephone number displayed on the output window 151a is attempted.

Figure 3B:
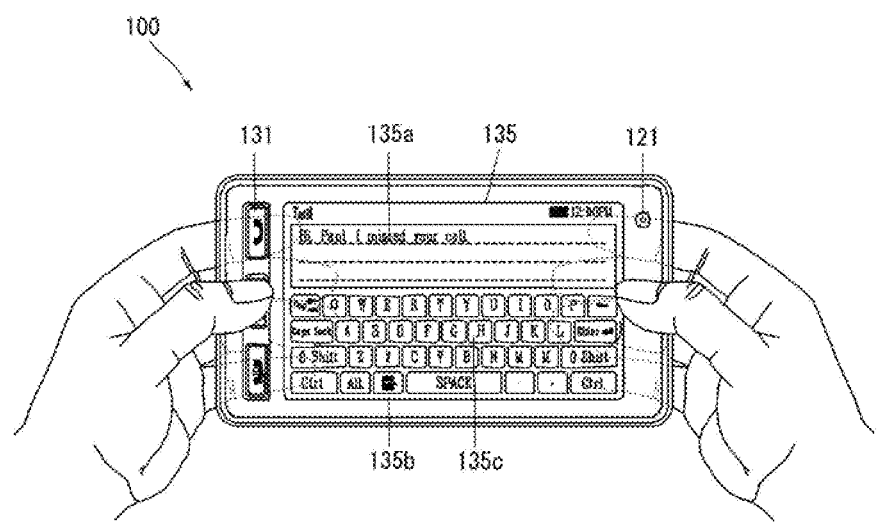

FIG. 3B shows that touch applied to soft keys 151c is input through the rear side of the terminal body. FIG. 3B shows the landscape of the terminal body while FIG. 3A shows the portrait of the terminal body. The display unit 151 may be constructed such that an output image is converted according to the direction in which the terminal body is located. FIG. 3B shows the operation of the mobile terminal 100 in a text input mode. The display unit 151 displays an output window 135a and an input window 135b. A plurality of soft keys 135c that indicate at least one of characters, symbols and numerals may be arranged in the input window 135b. The soft keys 135c may be arranged in the form of QWERTY keys.

When soft keys 135c are touched through the touch pad 135, characters, numerals and symbols corresponding to the touched soft keys 135c are displayed on the output window 135a. Touch input through the touch pad 135 may prevent the soft keys 135c from being covered with user's fingers when the soft keys 135c are touched as compared to touch input through the display unit 151. When the display unit 151 and the touch pad 135 are transparent, fingers located behind the terminal body may be confirmed with the naked eye, and thus touch input may be performed more correctly. The display unit 151 or the touch pad 135 may be constructed such that it receives touch input in a scroll manner. The user may scroll the display unit 151 or the touch pad 135 to move an object displayed on the display unit 151, for example, a cursor or a pointer located on an icon. Furthermore, when a finger moves on the display unit 151 or the touch pad 135, the finger moving path may be visually displayed on the display unit 151. This will be useful to edit an image displayed on the display unit 151 or perform other similar tasks.

Figure 4:
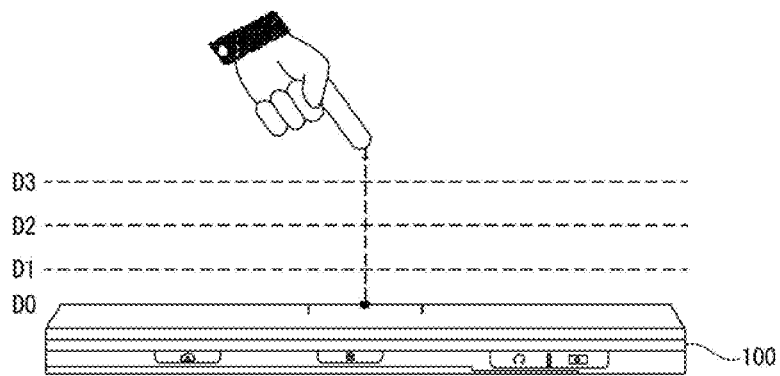
FIG. 4 is a view for explaining a proximity depth of a proximity sensor in accordance with one embodiment.

For a case where the display unit 151 (touch screen) and the touch pad 135 are simultaneously touched in a predetermined period of time, a specific function of the mobile terminal 100 may be executed. The case may include a case that the user clamps the terminal body using the thumb and the index finger. The specific function may include activation or inactivation of the display unit 151 or the touch pad 135, for example. The proximity sensor described with reference to FIG. 1 will now be explained in more detail with reference to FIG. 4. As shown in FIG. 4, when a pointer such as a user's finger approaches the touch screen, the proximity sensor located inside or near the touch screen senses the approach and outputs a proximity signal. The proximity sensor may be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth may be known by using a plurality of proximity sensors having different detection distances and comparing proximity signals respectively output from the proximity sensors. FIG. 4 shows the section of the touch screen in which proximity sensors capable of sensing three proximity depths are arranged. Proximity sensors capable of sensing less than three or more than four proximity depths may be arranged in the touch screen.

In one embodiment when the pointer completely comes into contact with the touch screen at a distance D0, it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth.

When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch. Accordingly, the controller 180 may recognize the proximity touch as various input signals according to the proximity distance and proximity position of the pointer with respect to the touch screen and perform various operation controls according to the input signals.

Figure 5:
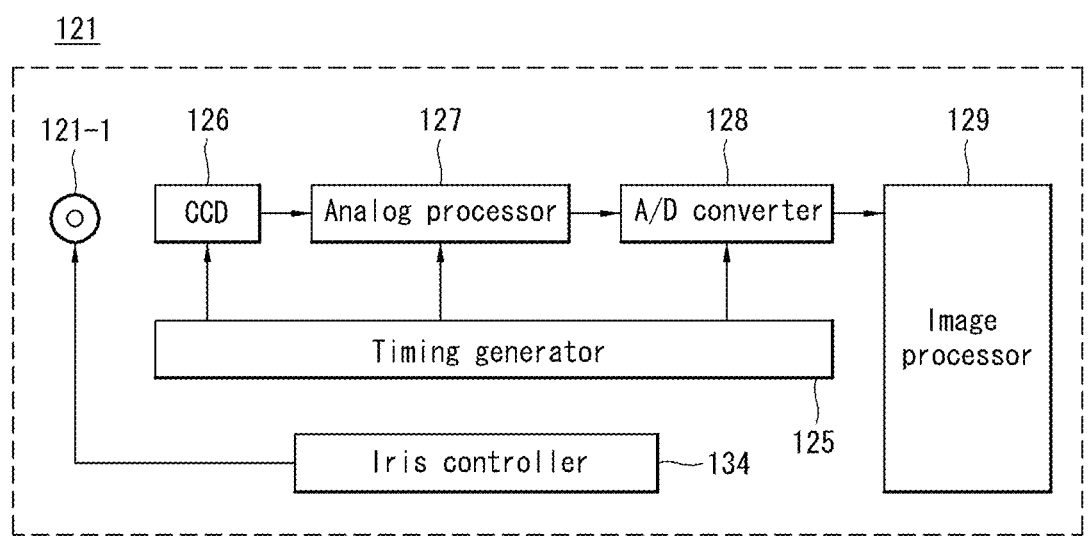
FIG. 5 is a block diagram of a camera illustrated in FIG. 1.
Figure 6:
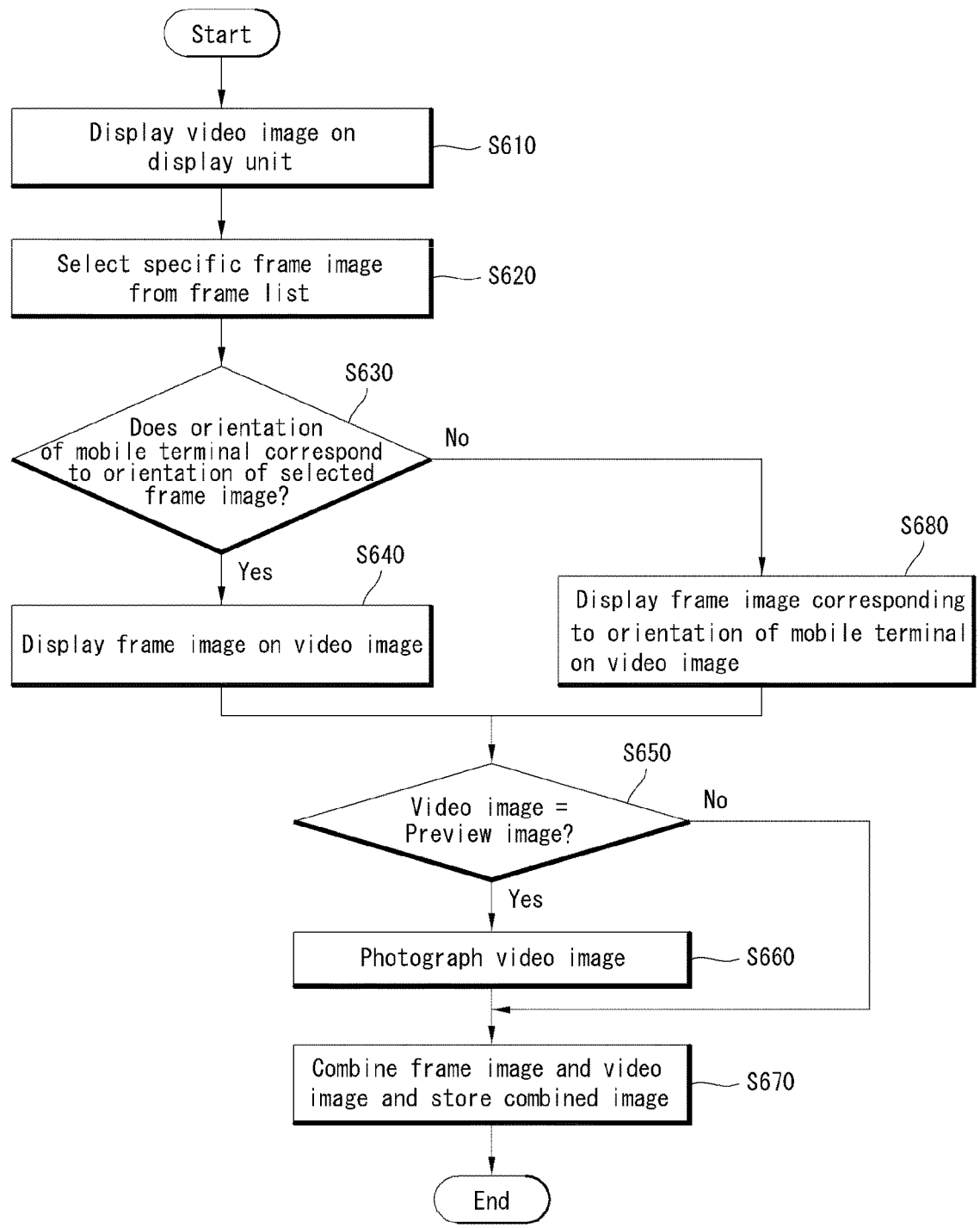
FIG. 6 is a flow chart of a method of displaying an image on a mobile terminal according to one embodiment.

According to one embodiment of the present disclosure, the aforementioned method may be embodied as computer readable codes on a computer readable recording medium. The computer readable recording medium is any data storage device that may store data which may be thereafter read by a computer system. Examples of the computer readable recording medium include ROM, RAM, CD-ROM, magnetic tapes, floppy disks, optical data storage devices, and carrier waves (such as data transmission through the Internet). The computer may include the controller 180 of the mobile terminal 100. Referring to FIG. 5, the camera 121 includes an iris controller 124, a timing generator 125, a charge coupled device (CCD) 126, an analog processor 127, an A/D converter 128 and an image processor 129.

The iris controller 124 outputs a signal for controlling the quantity of incident light to a camera lens 121-1. The timing generator 125 generates various timing signals required for the operation of the camera 121. The CCD 126 is an image sensor that converts an optical signal input through the camera lens 121-1 into an electric signal. The analog processor 127 latches a signal received from the CCD 126 and performs double sampling, gain flare, shading correction and potential gamma correction on the latched signal to output an analog processed image signal. The A/D converter 128 converts the analog processed image signal into digital image data.

The image processor 129 receives the digital image data from the A/D converter 129 and performs various image processing operations including white balancing, data detection and gamma correction on the image signal. Furthermore, the image processor 129 compresses the processed video data and outputs the compressed video data. The above-described components constructing the camera 121 of the mobile terminal 100 operate under the control of the controller 180, and image signals are stored in the form of a frame in the memory 160. The memory 160 stores a program for executing a panorama photographing operation of the controller 180 and related information and outputs the information to the controller 180 if required.

Figure 7A:
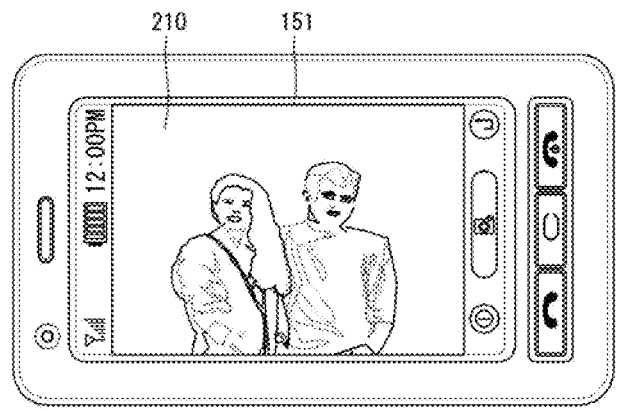
FIGS. 7A, 7B, 7C and 7D illustrate an operation of displaying a captured image and a frame image together according to one embodiment.

Referring to FIGS. 6 through 9, the controller 180 of the mobile terminal 100 displays an image 210 on the display unit 151 (S610), as illustrated in FIG. 7A. The image 210 may be a preview image captured by the camera 121, or an image previously captured and stored in the memory 160. The image 210 may also be one captured by another user's mobile terminal or other device and transmitted to the mobile terminal 100 and stored in memory 160. In other words, image 210 may be any image stored in memory 160 or other medium which can be accessed by the mobile terminal.

In FIG. 7A, the orientation of the mobile terminal 100 is a landscape orientation, and thus the image 210 is also displayed in a landscape orientation. A user may interact with the mobile terminal to cause the controller 180 to display a frame list 220. The frame list is configured to include and display as an icon a list of different frames (i.e., graphic borders) that can be added to an image. Said frames provide an ornamental feature to an image according to a user's selection from the frame list 220. For example, the frames may be in the shape of a heart, flowers, or other graphically implemented features that can be used to adorn a picture so that the margins of an image can be hidden from view after the application of the frame to the image. The mid-portion of the frame (i.e., the portion resembling an opening in a picture frame) may be used to expose a point of focus of a target image so that a viewer's attention is pointed towards portions of the image that are displayed within the middle of the frame.

Figure 7B:
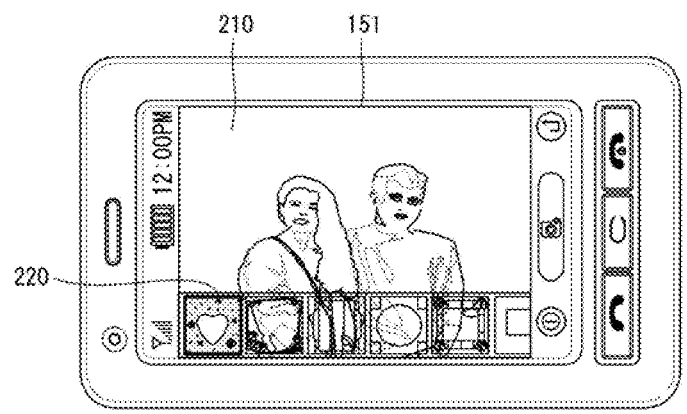

In one embodiment, a use selects a frame 230 from the frame list 220 according to a user interaction (S620), as illustrated in FIG. 7B. The controller 180 may display the frame list 220 as a thumbnail image. Frame images may be created by a user or provided by the mobile terminal 100. Otherwise, the frame images may be downloaded from an external server or received from other users through the wireless communication unit 110.

These frame images are stored in the memory 160. The frame list 220 according to one embodiment of the present disclosure may be displayed on the display unit 151 in various manners. Specifically, the controller 180 may analyze an image characteristic parameter of the captured image 210 displayed on the display unit 151 and display the frame list 220 including a plurality of frame images corresponding to the captured image 210 characteristic parameter preferentially.

The image 210 characteristic parameter may include one of luminance, value, saturation, shade, hue and distinctness of the captured image 210. For example, the controller 180 may analyze the hue or saturation of the captured image 210 displayed on the display unit 151 and display the frame list 220 including frame images having blue tones when determining that the captured image 210 has a blue tone. Accordingly, the user may select a frame image from the frame list 220 including frame images suitable for the color of the captured image 210 to reduce a time required to search for the frame image. Furthermore, frame images the user prefers may be preferentially displayed in the frame list 220 or random frame images may be displayed in the frame list 220.

Figure 7C:
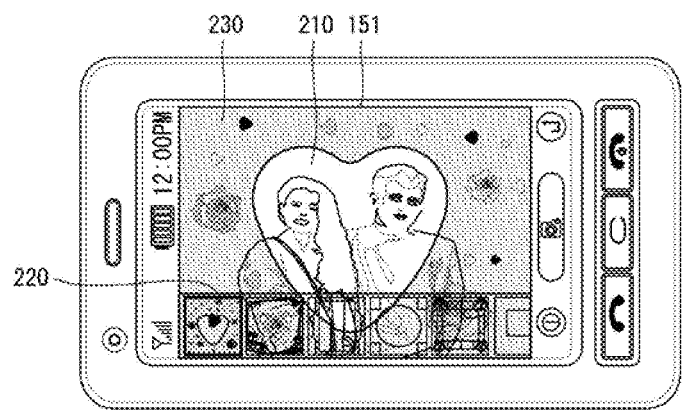

A method of displaying the frame list 220 may be varied by the user. The plurality of frame images displayed in the frame list 220 may be changed according to a predetermined operation of the user, for example, a touch-and-drag operation, or through a predetermined direction key. Here, the outline of the frame image selected from the plurality of frame images displayed in the frame list 220 may be highlighted. When one of the plurality of frame images is selected from the frame list 220 through a predetermined operation, the selected frame image 230 is overlaid on the video image 210, as illustrated in FIG. 7C.

Figure 7D:
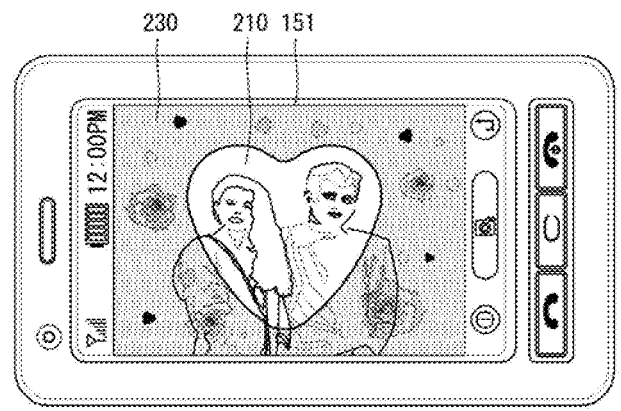

When the frame image 230 is displayed on the captured image 210, the frame list 220 may not be displayed on the display unit 151 through a predetermined operation of the user, as illustrated in FIG. 7D. Although FIGS. 7A, 7B, 7C and 7D illustrate that the frame image 230 is selected from the frame list 220 and overlaid on the captured image 210, the present disclosure is not limited thereto. That is, the operations illustrated in FIGS. 7B and 7C may be omitted and the frame image 230 may be directly displayed on the display unit 151 through the operation illustrated in FIG. 7D.

In this case, the frame image 230 may be searched through a predetermined key input, for example, through an operation of a direction key, without displaying the frame list 220. Furthermore, the controller 180 may analyze the image characteristic parameter of the captured image 210 displayed on the display unit 151 and display the frame image 230 corresponding to the image characteristic parameter such that the frame image 230 may be preferentially searched. Here, the image characteristic parameter may be one of the luminance, value, saturation, shade, hue and distinctness of the captured image 210. For example, the controller 180 may analyze the hue or saturation of the captured image 210 displayed on the display unit 151 and display a frame image having a blue tone preferentially when determining that the captured image 210 has a blue tone.

Accordingly, a frame image suitable for the color of the captured image 210 may be displayed such that the frame list 220 may be preferentially searched to reduce a time required to search for the frame image 230. Furthermore, frame images the user prefers may be preferentially displayed in the frame list 220 or random frame images may be displayed in the frame list 220. The controller 180 determines whether the orientation of the mobile terminal 100 corresponds to the orientation of the selected frame image 230 in a step S630. When the orientation of the mobile terminal 100 corresponds to the orientation of the selected frame image 230, the selected frame image 230 is overlaid on the video image 210 without changing the orientation thereof in a step S640.

When the orientation of the mobile terminal 100 does not correspond to the orientation of the selected frame image 230 (S630), the orientation of the selected frame image 230 is changed to be suited to the orientation of the mobile terminal 100 and overlaid on the captured image 210 (S680). That is, the selected frame image 230 may be displayed in portrait when the orientation of the mobile terminal 100 is a portrait orientation, and the selected frame image 230 may be displayed in landscape when the orientation of the mobile terminal 100 is a landscape orientation. Furthermore, mobile terminal 100 is configured such that the angle of display of the frame image 230 changes with respect to the display as the mobile terminal is rotated as provided in further detail below.

Figure 8A:
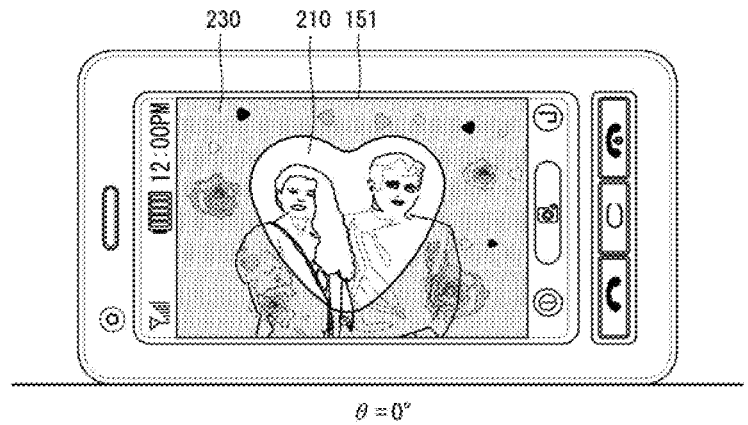
FIGS. 8A, 8B and 8C illustrate an operation of displaying a frame image according to the orientation of the mobile terminal in accordance with one embodiment.
Figure 8B:
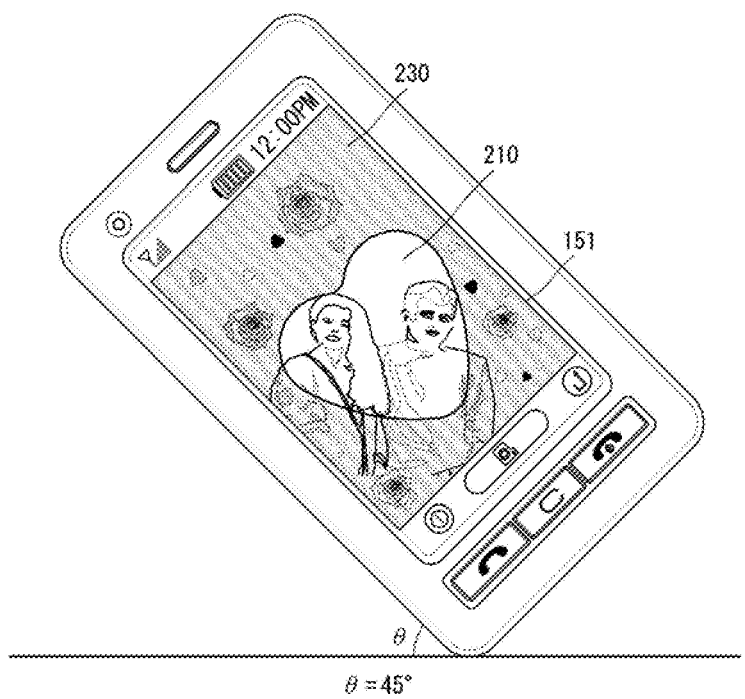
Figure 8C:
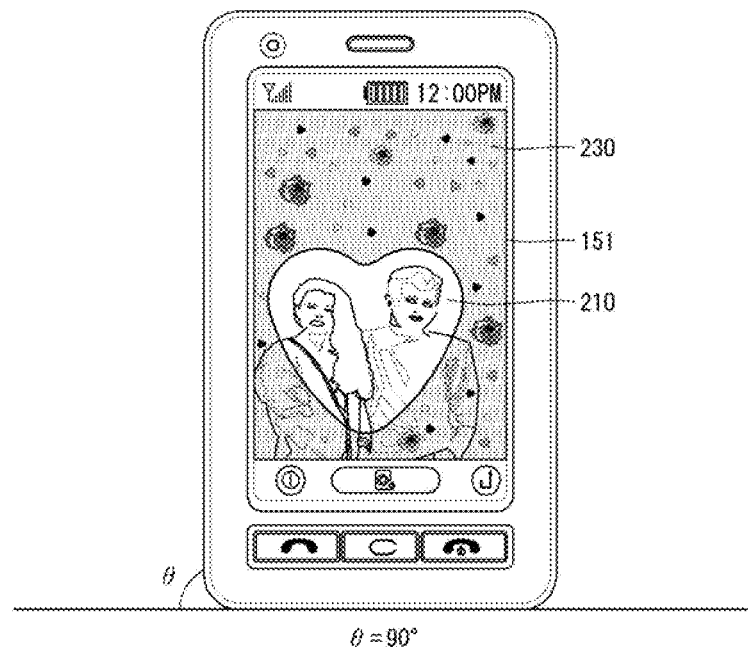

FIGS. 8A, 8B and 8C illustrate that the orientation of the frame image 230 is continuously changed according to the orientation of the mobile terminal 100 in accordance with an embodiment of the present disclosure. It is assumed that landscape is a standard orientation of the mobile terminal 100. Referring to FIG. 8A, the orientation of the mobile terminal 100 is landscape, and thus the frame image 230 is displayed in landscape. Referring to FIG. 8B, the mobile terminal 100 is tilted from the standard orientation by 45° (θ=45°), and thus the frame image 230 is tilted from the standard orientation by 45° (θ=45°) and displayed on the display unit 151.

Referring to FIG. 8C, the orientation of the mobile terminal 100 is portrait, that is, the mobile terminal 100 is tilted from the standard orientation by 90° (θ=90°), and thus the frame image 230 is tilted from the standard orientation by 90° (θ=90°) and displayed in portrait. Accordingly, the orientation of the frame images 230 may continuously change, in lock-step, to match the orientation of the mobile terminal 100 as illustrated in FIGS. 8A, 8B and 8C.

In accordance with another embodiment, the orientation of the frame image may be discretely changed according to the orientation of the mobile terminal 100. Referring to FIGS. 9A, 9B, 9C and 9D, assuming that landscape is a standard orientation of the mobile terminal 100, the adjustment in orientation of the framed image can be based on whether the mobile terminal 100 is tilted from the standard orientation by, for example less than 45° (0°<θ<45°), or more than 45° and less than 90° (45°<θ<90°), for example. In one embodiment, when orientation of the mobile terminal 100 is changed within the above ranges, the orientation of the frame image 230 displayed on the mobile terminal 100 is not changed. When the orientation of the mobile terminal 100 is changed beyond one of said ranges, the orientation of the frame image 230 is changed accordingly.

Figure 9A:
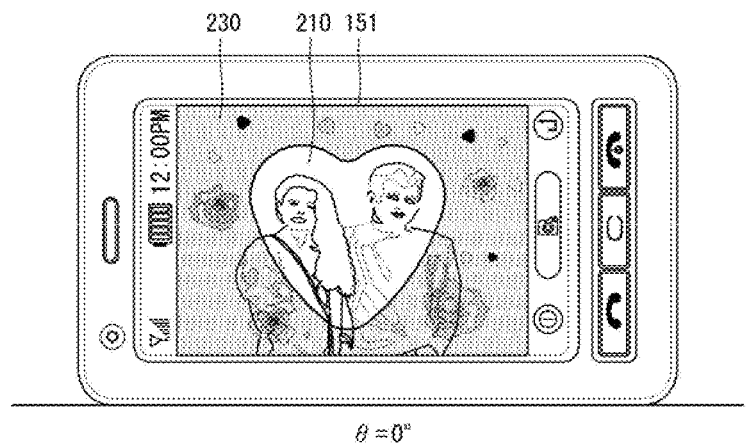
FIGS. 9A, 9B, 9C and 9D illustrate an operation of displaying a frame image according to the orientation of the mobile terminal in accordance with another embodiment.
Figure 9B:
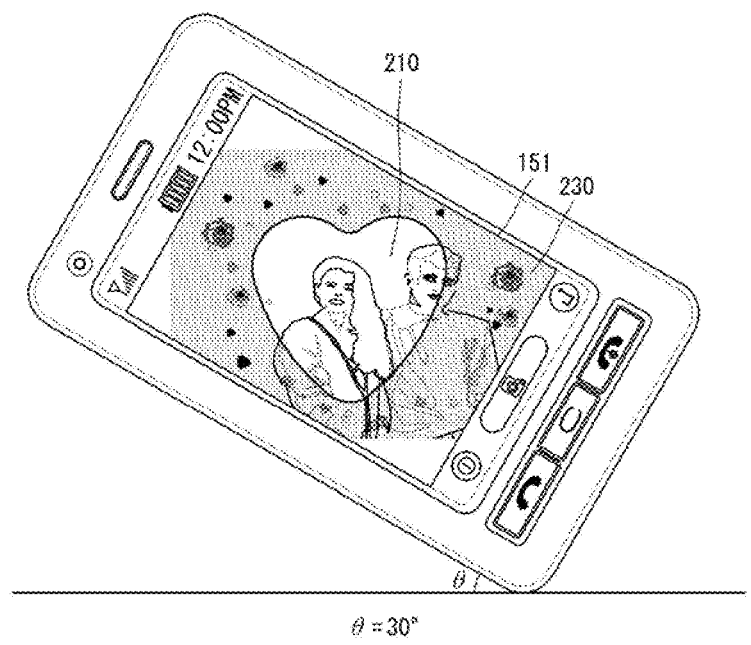

Referring to FIG. 9A, the orientation of the mobile terminal 100 corresponds to the first range (0°<θ<45°), and thus the frame image 230 corresponding to the first section, for example, the frame image 230 arranged in landscape is displayed. Referring to FIG. 9B, the orientation of the mobile terminal 100 corresponds to the first range (0°<θ<45°) although the orientation of the mobile terminal 100 is changed from the orientation shown in FIG. 9A, and thus the frame image 230 arranged in landscape, which is identical to the frame image 230 illustrated in FIG. 9A, is displayed.

Figure 9C:
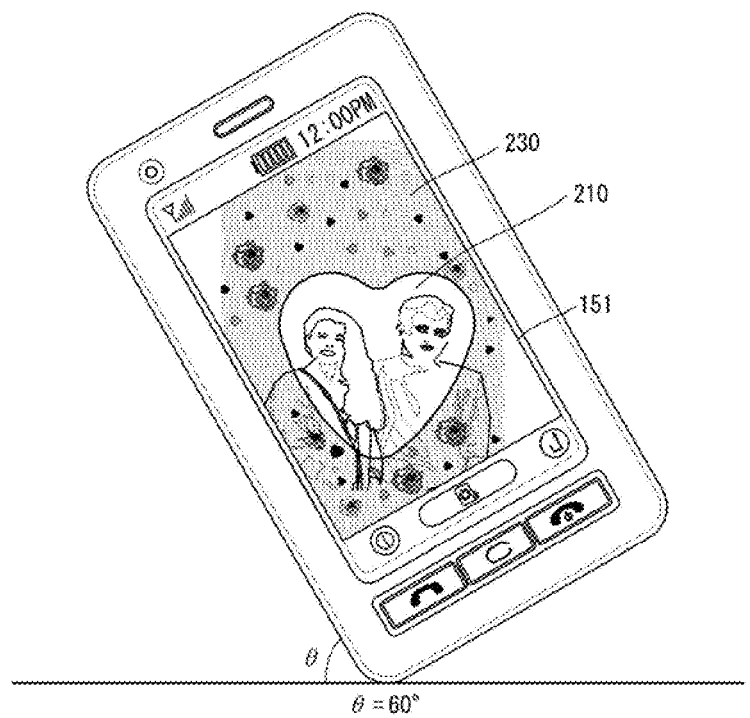
Figure 9D:
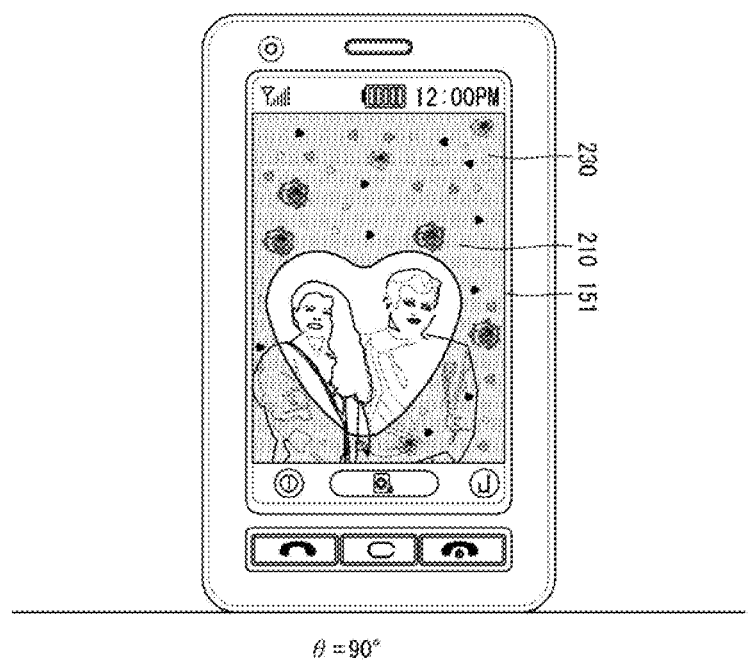

Referring to FIGS. 9C and 9D, the orientation of the mobile terminal 100 corresponds to the second range (45°<θ<90°) although the orientation of the mobile terminal 100 in FIG. 9C is different from the orientation of the mobile terminal 100 in FIG. 9D, and thus the frame image 230 corresponding to the second section, for example, the frame image 230 arranged in portrait, is displayed in both cases shown in FIGS. 9C and 9D.

Ranges divided according to the orientation of the mobile terminal 100 are not limited to the above mentioned exemplary ranges. For example, the orientation of the mobile terminal 100 may be classified into a first range (0°<θ<30°), a second range (30°<θ<60°) and a third range (60°<θ<90°) such that the orientation of the frame image 230 may be fixed when the orientation of the mobile terminal 100 is changed within a range and the orientation of the frame image 230 may be changed when the orientation of the mobile terminal 100 is changed beyond a certain range. The smaller the ranges are defined the smoother would be the change in orientation of the frame image 230.

Referring back to FIG. 6, the controller 180 determines whether the captured image 210 corresponds to a preview image or a previously stored image (S650). When the captured image 210 is a preview image, that is, an image input through the camera 121, the captured image 210 is captured through a photographing command (S660). Then, the frame image 230 displayed through the operations S640 and S680 and the captured image 210 captured through the operation S660 are combined and stored in the memory 160 (S670).

When the controller 180 determines that the captured image 210 corresponds to an image previously stored in the memory 160, the frame image 230 displayed according to the orientation of the mobile terminal 100 is combined with the previously stored captured image 210 and stored in the memory 160 in the step S670.

The user may change the size, direction and position of the frame image 230 applied to an embodiment of the present disclosure to edit the frame image 230 before (S670), which will be explained detail with reference to FIGS. 10, 11 and 12. The controller 180 displays the video image 210 and the frame image 230 overlaid on the captured image 210 on the display unit 151. The controller 180 senses simultaneously generated touch signals with respect to two different points on the display unit 151 employing a touch screen.

Touches simultaneously given to two different points are referred to as "simultaneous touch" hereinafter. The simultaneous touch does not mean only touches given to two different points at the exact same time. That is, a case where a specific point is touched first and then another point is touched within a predetermined time while the touch given to the specific point is maintained may also correspond to the simultaneous touch.

Figure 10A:
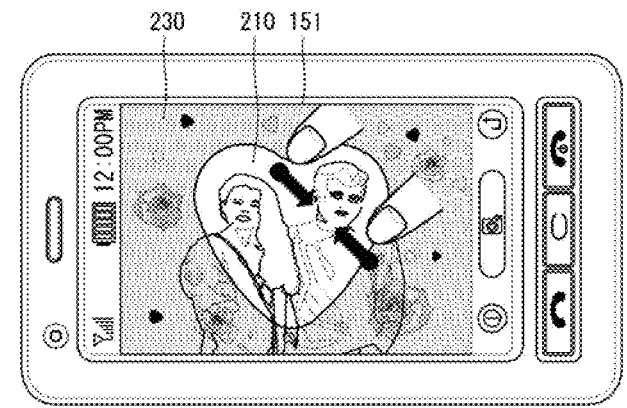
FIGS. 10A, 10B and 10C illustrate an operation of controlling the size of a frame image according to one embodiment.
Figure 10B:
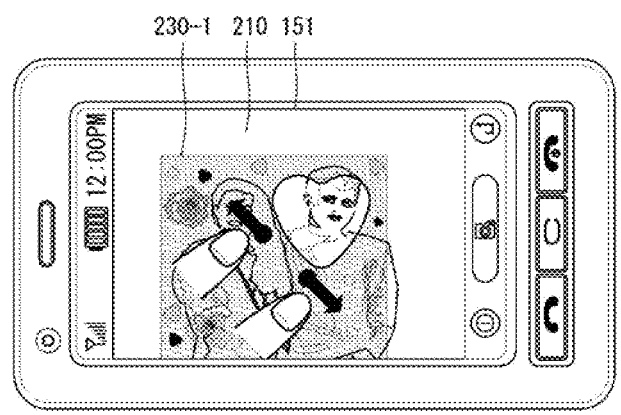
Figure 10C:
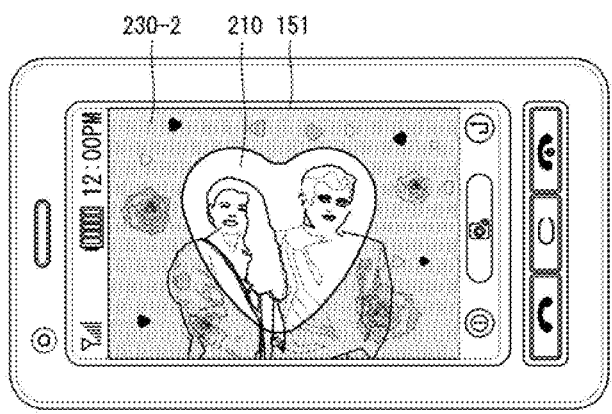
Figure 11A:
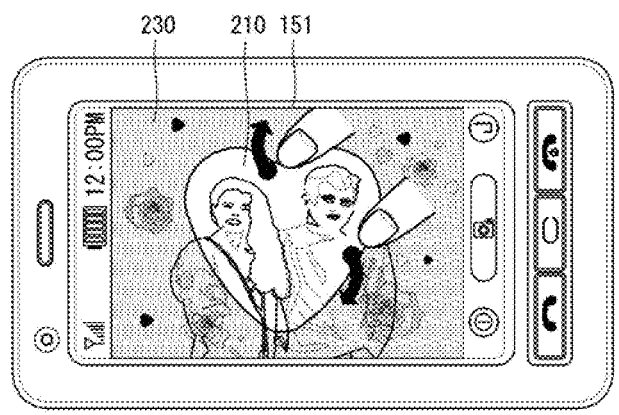
FIGS. 11A and 11B illustrate an operation of controlling the orientation of the frame image according to one embodiment.
Figure 11B:
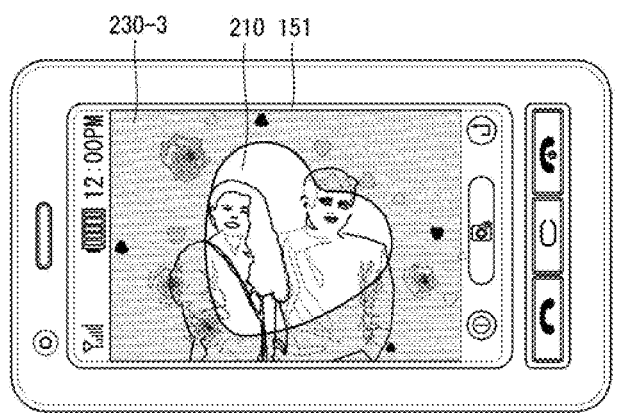

When the controller 180 senses a simultaneous touch applied to the touch screen on which the captured image 210 and the frame image 230 are displayed together, the controller 180 controls the size, position and direction of the frame image 230. Specifically, when the controller 180 senses a drag operation of reducing a distance between simultaneously touched points, as illustrated in FIG. 10A, the size of the frame image 230-1 is decreased and displayed as illustrated in FIG. 10B. When the controller 180 senses simultaneous touch signals and a drag operation of increasing a distance between simultaneously touched points, the size of the frame image 230-2 is enlarged and displayed as illustrated in FIG. 10C. Furthermore, when the controller 180 senses simultaneous touch signals applied to the touch screen on which the captured image 210 and the frame image 230 are displayed together, and then senses a drag operation of rotating simultaneously touched points in predetermined directions, as illustrated in FIG. 11A, the frame image 230-3 is rotated by a predetermined angle in the direction of rotating the simultaneously touched points, as illustrated in FIG. 11B.

Figure 12A:
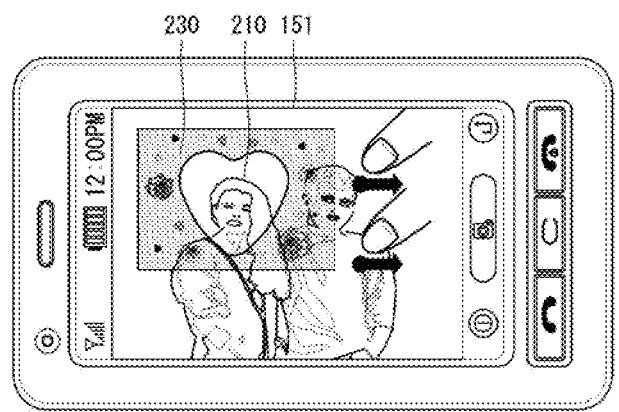
FIGS. 12A and 12B illustrate an operation of controlling the position of the frame image according to one embodiment.
Figure 12B:
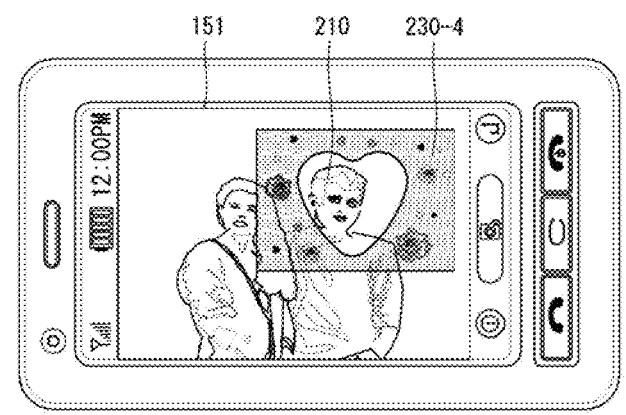

Moreover, when the controller 180 senses simultaneous touch signals applied to the touch screen on which the captured image 210 and the frame image 230 are displayed together, and then senses an operation of dragging simultaneously touched points in the same direction, as illustrated in FIG. 12A, the position of the frame image 230-4 is moved by a predetermined distance in the drag direction. As described above, the frame image 230 displayed on the captured image 210 may be edited through a simple touch operation, and thus various images may be generated. While FIGS. 10, 11 and 12 illustrate that the size, position and orientation of the frame image 230 are controlled through a touch operation, the present disclosure is not limited thereto. That is, the size, position, and orientation of the frame image 230 may be controlled by operating the keypad, dome switch, touch pad (constant voltage/capacitance), jog wheel, and jog switch of the user input unit 130.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method of displaying a still image and a frame image on a mobile terminal, the method comprising:
    displaying the still image on a display unit of the mobile terminal;
    analyzing an image characteristic parameter of the displayed still image, wherein the image characteristic parameter comprises at least luminance, value, saturation, shade, hue or distinctness of the displayed still image;
    selecting a plurality of frame images from among a predetermined set of frame images, the selection of the plurality of frame images based on the analyzed image characteristic parameter, wherein the plurality of frame images is different from the predetermined set;
    displaying a frame list including the selected plurality of frame images on the display unit, wherein each frame image of the frame list is displayed in a thumbnail image;
    receiving a selection of one of the plurality of frame images;
    displaying the selected one of the plurality of frame images as overlapped with the displayed still image on the display unit, wherein margins of the displayed still image are hidden and the displayed one of the plurality of frame images has an opening for exposing a point of focus of the displayed still image;
    detecting a change in an orientation of the mobile terminal while the displayed still image remains displayed on the display unit; and
    changing an orientation of the displayed still image and an orientation of the displayed one of the plurality of frame images based on the change in the orientation of the mobile terminal, wherein the orientation of the displayed one of the plurality of frame images is unchanged relative to the orientation of the displayed still image.

2. The method of claim 1, further comprising:
continuously changing the orientation of the displayed one of the plurality of frame images and the orientation of the displayed still image according to a continuous variation of the orientation of the mobile terminal.

3. The method of claim 1, further comprising:
discretely changing the orientation of the displayed one of the plurality of frame images according to a discrete variation of the orientation of the mobile terminal.

4. The method of claim 1, wherein the displayed still image is a stored image.

5. The method of claim 1, further comprising:
processing a photographing command to obtain the still image;
generating a combined image by combining the displayed still image and the displayed one of the plurality of frame images; and
storing the generated combined image.

6. The method of claim 1, further comprising:
changing a color of the displayed one of the plurality of frame images according to the analyzed image characteristic parameter of the displayed still image.

7. The method of claim 1, further comprising:
controlling a size of the displayed one of the plurality of frame images.

8. The method of claim 7, further comprising:
controlling at least the size or the orientation of the displayed one of the plurality of frame images in response to a plurality of simultaneously generated touch signals.

9. The method of claim 1, further comprising:
moving the orientation of the displayed one of the plurality of frame images.

10. The method of claim 1, further comprising:
creating the displayed one of the plurality of frame images according to a user input.

11. The method of claim 1, further comprising:
editing the displayed one of the plurality of frame images according to a user input.

12. A mobile terminal comprising:
a display unit configured to display images; and
a controller configured to:

control the display unit to display a first still image;
analyze an image characteristic parameter of the displayed first still image, wherein the image characteristic parameter comprises at least luminance, value, saturation, shade, hue or distinctness of the first still image;
select a plurality of second images from among a predetermined set of second images, the selection of the plurality of second images based on the analyzed image characteristic parameter, wherein the plurality of second images is different from the predetermined set;
control the display unit to display a frame list including the selected plurality of second images;
receive a selection of one of the plurality of second images;
control the display unit to overlap the selected one of the plurality of second images and the displayed first still image such that margins of the displayed first still image are hidden, the one of the plurality of second images having an opening for exposing a point of focus of the displayed first still image;
detect a change in an orientation of the mobile terminal while the displayed still image remains displayed on the display unit; and
control the display unit to change an orientation of the displayed first still image and an orientation of the selected one of the plurality of second images based on the change in the orientation of the mobile terminal, wherein the orientation of the selected one of the plurality of second images is unchanged relative to the orientation of the displayed first still image.

13. The mobile terminal of claim 12, wherein the controller is further configured to create the one of the plurality of second images according to a user input.

14. The mobile terminal of claim 12, wherein the controller is further configured to edit the one of the plurality of second images according to a user input.

15. The mobile terminal of claim 12, wherein the controller is further configured to control the display unit to:
continuously change the orientation of the selected one of the plurality of second images and the orientation of the displayed first still image according to a continuous variation of the orientation of the mobile terminal.

16. The mobile terminal of claim 12, wherein the controller is further configured to control the display unit to:
discretely change the orientation of the selected one of the plurality of second images according to a discrete variation of the orientation of the mobile terminal.

* * * * *